Dec. 5, 1961 H. MUTCHNIK 3,011,229
FASTENER ASSEMBLIES
Filed Jan. 14, 1955 3 Sheets-Sheet 1
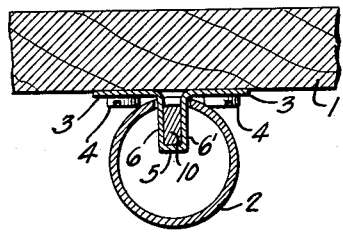
Fig. 2.
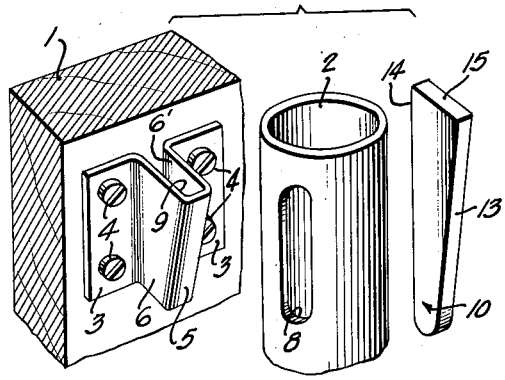
Fig. 4.
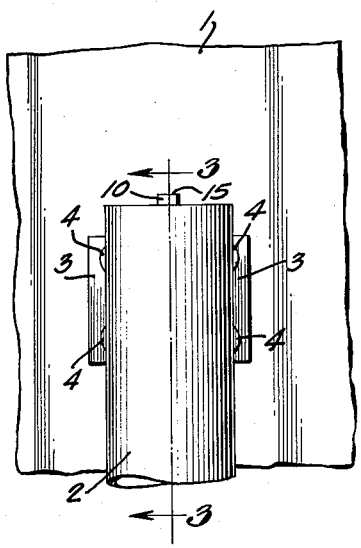
Fig. 1.
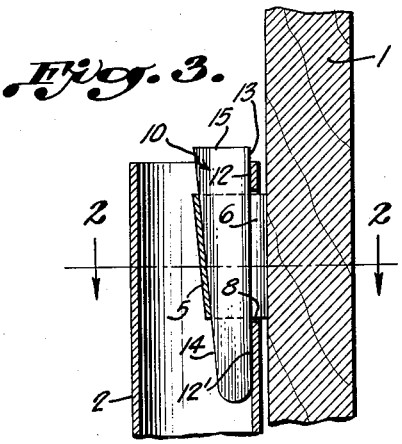
Fig. 3.
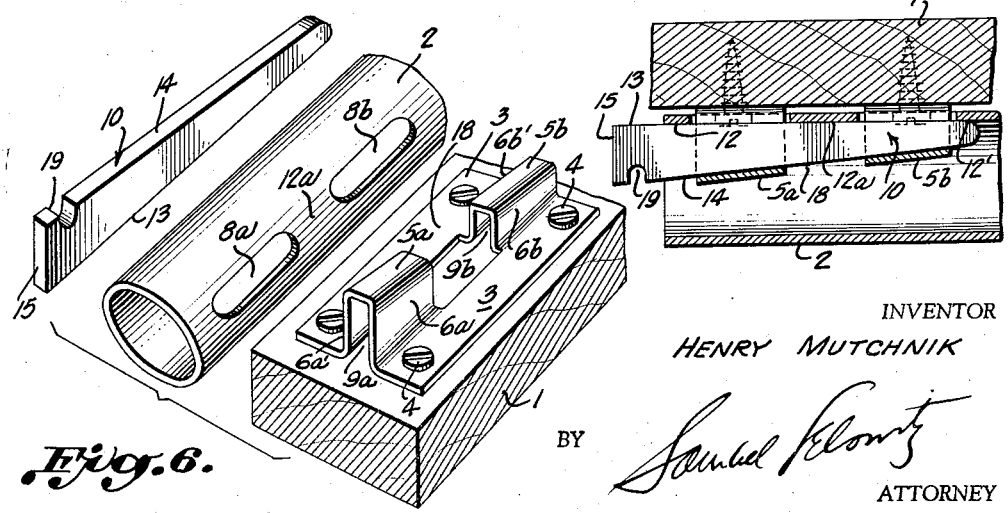
Fig. 5.
Fig. 6.
INVENTOR
HENRY MUTCHNIK
BY
ATTORNEY

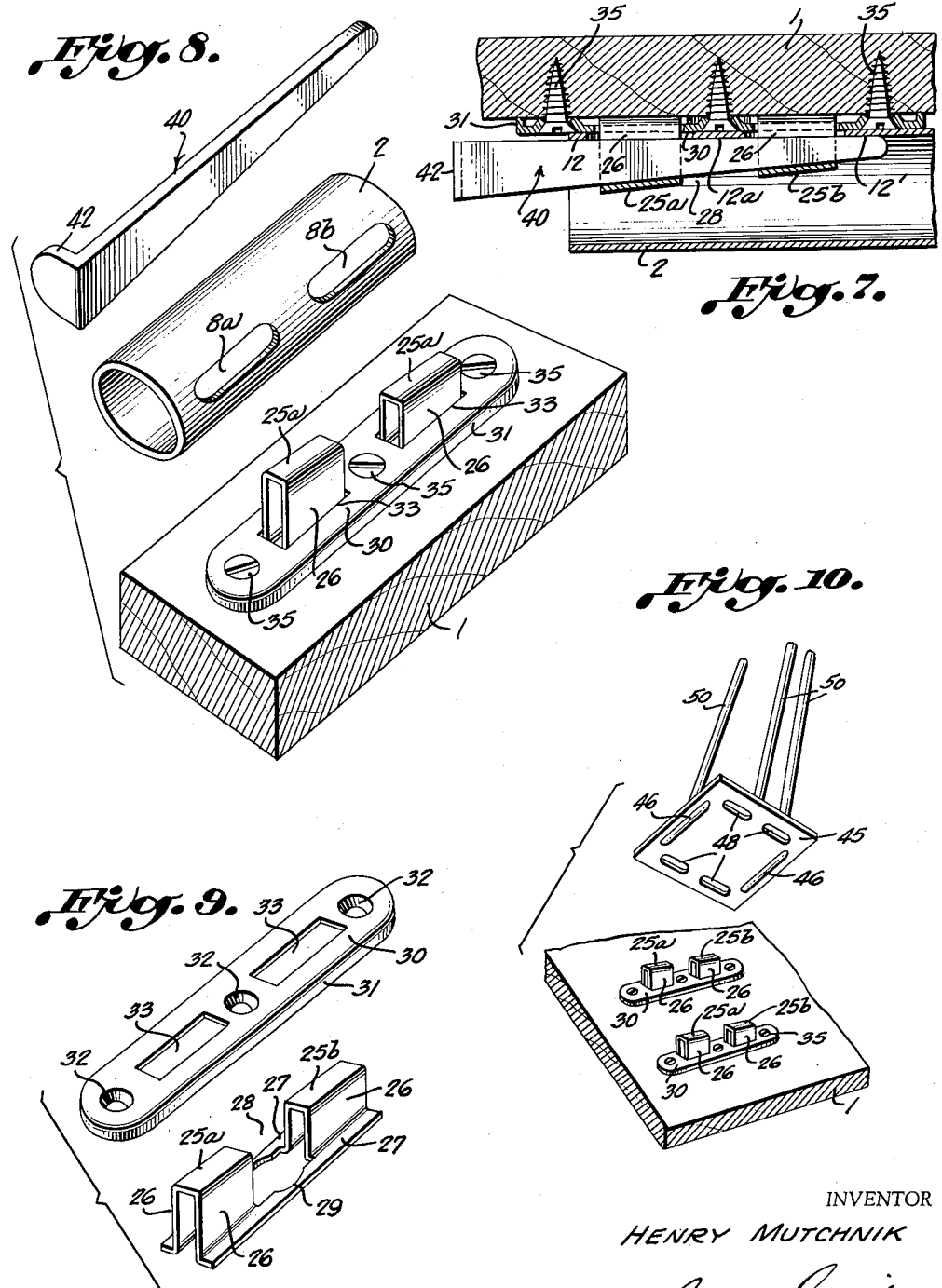

Dec. 5, 1961 H. MUTCHNIK 3,011,229
FASTENER ASSEMBLIES
Filed Jan. 14, 1955 3 Sheets-Sheet 3
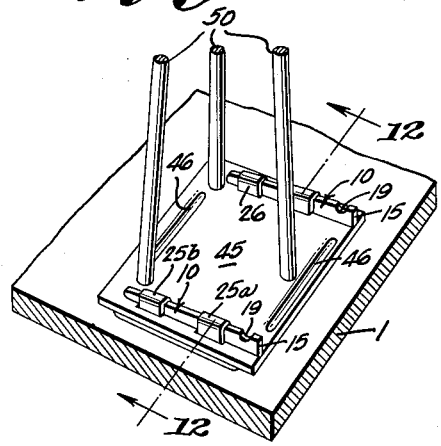
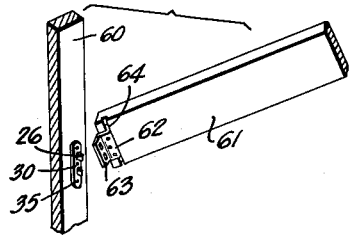
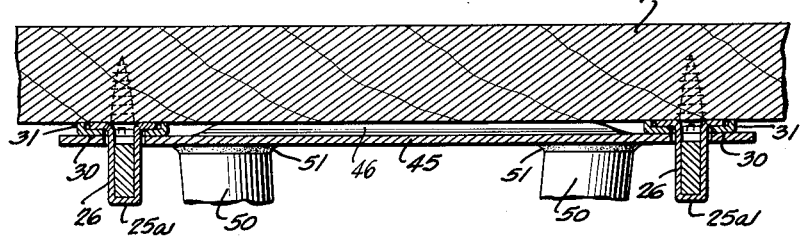
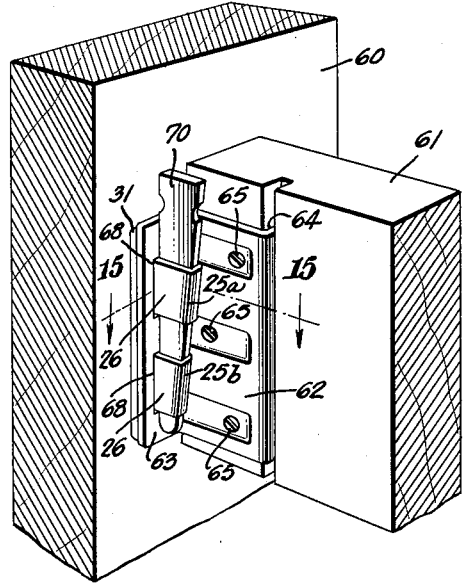
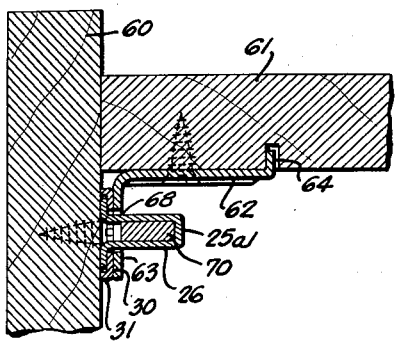
INVENTOR
HENRY MUTCHNIK
BY
ATTORNEY

United States Patent Office 3,011,229
Patented Dec. 5, 1961

3,011,229
FASTENER ASSEMBLIES
Henry Mutchnik, 4111 W. Belvedere Ave.,
Baltimore 15, Md.
Filed Jan. 14, 1955, Ser. No. 481,933
8 Claims. (Cl. 20—92.7)

This invention relates to fastener assemblies and more particularly to wedge-type fasteners for interconnecting structural members of all types.

It is the object of the present invention to provide a fastener assembly which is rugged and economical in construction and which is reliable in operation to maintain a secure fastening between structural members of wood, metal, plastics or other structural materials.

It is another object of the invention to provide a fastener assembly which may be stamped from sheet metal and which does not require any close manufacturing tolerances in order to obtain a tight interconnection between the parts to which the assembly may be applied. The fastener assembly is self-compensating in use and may be tightened periodically in order to maintain an effective interengagement between the parts.

The invention proceeds upon the principle of utilizing an extended area of contact between a female member of stamped sheet metal in the form of one or more loops which is adapted to be affixed to one structural member and which is integrated to another structural member by the interconnection therewith of a male member in the form of a flat sheet metal wedge, the assembly being effective over substantial areas of its edges or surfaces so that the active portions of the fastener are widely distributed, do not cause any wear at any sharp points or edges, and may be shifted from time to time to tighten the interconnection between the parts as wear in the assembly takes place, which is not precluded by any worn points, edges or surfaces of the wedge assembly.

The present invention presents an improvement over the type of fastening disclosed in the U.S. patent to Macleod, No. 2,461,648, February 15, 1949, by simplifying the construction therein disclosed to render the fastening adaptable to and practical for all types of structural assemblies such as buildings and furniture of metal, wood, plastics or composite materials.

Other objects and purposes will appear from the detailed description of the invention following hereinafter, taken in conjunction with the accompanying drawings, wherein FIG. 1 is a plan view of a fastener assembly in accordance with the invention between a plane and tubular structural member;

FIG. 2 is a transverse sectional view of FIG. 1 along line 2—2 of FIG. 3;

FIG. 3 is a vertical sectional view along line 3—3 of FIG. 1;

FIG. 4 is an exploded view, in perspective, of the components of the fastener assembly shown in FIGS. 1 to 3;

FIG. 5 is a vertical sectional view of a second embodiment of the invention having multiple loops in the fastener assembly;

FIG. 6 is an exploded view, in perspective, of the components of the fastener assembly shown in FIG. 5;

FIG. 7 is a vertical sectional view of a third embodiment of the invention presenting a variation of the assembly shown in FIG. 5 by the provision of the fastener loops as a separate part from the retainer therefor;

FIG. 8 is a perspective view of the components of the assembly shown in FIG. 7;

FIG. 9 is an exploded view, in perspective, of one of the details in FIGS. 7 and 8, namely, the multiple loop stamping and retainer therefor in separated condition;

FIG. 10 is an exploded view, in perspective, of a fastener assembly utilizing a plurality of multiple loop units for cooperation with a metallic plate for interconnection therewith;

FIG. 11 is a perspective view of the assembly shown in FIG. 10 in interconnected position;

FIG. 12 is a sectional view along line 12—12 of FIG. 11;

FIG. 13 is a perspective view of a pair of structural members exemplified by a bed post and bed rail, utilizing the fastener assembly in accordance with the invention;

FIG. 14 is an enlarged perspective view of the structural assembly shown in FIG. 13 with the parts in interconnected position; and FIG. 15 is a horizontal sectional view along line 15—15 of FIG. 14.

In the drawings are shown several embodiments of the basic invention disclosed herein which consists essentially in the interconnection of a pair of structural members by the affixation of one or more elongated U-shaped sheet metal loops to one of these members, with which the second structural member is interengaged, and by the fastening of the two together in this interengaged relationship with a flat sheet metal wedge provided with opposed straight edges which are inclined relatively to each other, correspondingly to the relative inclination of the coacting surfaces of the sheet metal loops and the second structural member.

In the first embodiment illustrated in FIGS. 1 to 4, the first structural member 1 may assume the form of a plane board which is desired to be interconnected with the second structural member 2, which may be in the form of a metallic cylindrical body. These structural members 1 and 2 may be a table top and a supporting leg therefor, respectively, but the invention is applicable to all locales of furniture, vehicle or building construction, as well as other diverse industrial arts.

One element of the fastener assembly in accordance with the invention consists of an elongated U-shaped sheet metal loop having the lateral flanges 3, which may be affixed to the structural member 1 by means of screw fasteners 4, rivets, or by welding or soldering or plastic adhesives if the member should be made of metal or plastic. The loop is formed by side walls 6 and 6' which are bent from the flanges 3 at their edges proximal to the structural member 1 and which side walls merge at the distal edge 5. The length of the side walls 6 is many times the spacing between the walls 6 and 6', and whether or not the distal edge 5 is rounded, the resulting passage 9 between the side walls is of substantially rectangular cross-section, and because the distal edge 5 slopes from one end to the other, this passage diminishes from its upper end shown in FIGS. 3 and 4 to its restricted end therebelow.

The second structural member 2 is provided with an elongated opening 8 which is slightly longer than the side walls of the U-shaped sheet metal loop and when the same is interengaged with the loop, as shown in FIG. 2, the rectangular passage 9 is outlined to receive the sheet metal wedge 10 having the opposite straight edges 13 and 14 relatively inclined to each other and corresponding to the inclination of the distal edge 5 and the inner surface of the member 2 which lies adjacent to the proximal part of the loop in intersecting relation therewith. When the wedge 10 is driven downwardly by a force applied to its larger end 15, it is guided smoothly within the rectilinear passage between the side walls of the loop, which accommodate closely the thickness of the wedge and the edges 13 and 14 act to press the two surfaces 12 and 12' on the inside of structural member 2 beyond the opposite ends of the opening 8, into tight engagement towards the structural member 1, as shown in FIG. 3.

While the theory of the inclined plane and wedge fasteners embodying that principle are notoriously old, distinct advantages accrue from the fact that the loop fastener of sheet metal as disclosed herein, having an elongated passage for receiving and guiding a flat sheet metal wedge therealong, acts to select at random, and over substantial areas, the effective portions along the distal edge of the loop against which the wedge transmits its force in a transverse direction to tightly press the two structural members together. Should a wearing of the parts take place, such wear may be taken up easily by merely driving in the wedge fastener further toward the restricted end of the passage into contact with the distal edge 5. Furthermore, a removal of the wedge 10 results in a convenient disassembly of the parts. No cutting or wearing action has taken place on either the wedge, the elongated loop or the second structural member which in any way prevents a reassembly of the parts and the obtention of as tight a connection therebetween as was had theretofore.

The utilization of sheet metal in the fabrication of the fastener assembly lends itself to economical mass production stamping methods and, of course, the weights of the sheet metal may be varied in dependence upon the intended uses for the fasteners. The need for close manufacturing tolerances in either the production of the fastener assemblies, or the structural members to which they are applied, is eliminated since a secure fastening is obtained between the structural members merely by the larger or smaller extent of penetration of the wedge into the sheet metal loop towards its restricted end.

In those cases where the sheet metal wedge 10 is stamped from 1/8" steel stock, the loop fastener 6 may be 1/2" in length. The further lengthening of the loop distributes the force of engagement between the structural members in a transverse direction.

The lengthening of the loop may be obtained by subdividing the U-shaped sheet metal loop into two displaced portions, as shown in the embodiment illustrated in FIGS. 5 and 6. In this constructional form, the mounting flanges 3 for the loop are continuous, but a space 18 is formed at the mid-portion thereof so that in effect two substantially rectangular passages are formed at the opposite ends of the loop assembly. The passage 9a is formed between the side walls 6a and 6a' and distal edge 5a and another passage 9b is formed at the restricted end of the loop assembly between side walls 6b and 6b' and distal edge 5b. The distal edges 5a and 5b are along a continuous straight line even though these are interrupted by the space 18 therebetween.

The second structural memebr 2 cooperating with this form of loop is provided with elongated openings 8a and 8b in alignment with each other, spaced by the intermediate portion 12a on the interior thereof which is disposed in the space 18 when the parts are interengaged as shown in FIG. 5. Thereupon the driving of the wedge 10 with the relatively inclined edges 13 and 14, corresponding to the inclination of the distal edges 5a and 5b relative to the internal surface of the structural member 2 beyond the openings 8a and 8b, namely, 12 and 12', respectively, and the surface 12a between the openings 8a and 8b, results in the forcing of the structural member 2 against structural member 1 to which the loop is affixed. In this embodiment of the invention a notch 19 may be provided in one edge of the wedge 10, for example, in edge 14 thereof, to facilitate a withdrawal thereof after the same has been driven in by a light hammer tap on the enlarged end 15 thereof. The withdrawal may be effected by the engagement of the notch 19 with a screw-driver or analogous tool. A punched aperture in the face of the wedge may be used in lieu of the notch.

In the embodiment described above, the U-shaped single or multiple sheet metal loop has its fastening flange 3 formed integrally with the upstanding loops. Manufacturing economies are attainable when the loops are stamped and shaped separately from the retaining means therefor onto one of the structural members. Such an arrangement is illustrated in FIGS. 7 to 9.

In the exploded view shown in FIG. 9, the loop body is stamped from an integral sheet of metal and is provided with lateral flanges 27 which are continuous along the length of the body and from which extend upwardly the side walls 26 of the loops merging in the distal edges 25a and 25b which are spaced from each other by the gap 28. The distal edges 25a and 25b may be inclined relative to the proximal flanges 27 along a continuous straight line.

A retainer for this multiple loop body is provided by a stamped frame 30 having a boundary flange 31, rectangular openings 33 for the extension of the loops 26 therethrough, as well as countersunk holes 32 at the ends and at the intermediate part of the retainer for receiving fastening screws 35 to affix the retainer 30 and thereby the loops 26 to the structural member 1. In order to accommodate the countersinking of the intermediate opening 32, the flanges 27 are recessed on their inner edges at 29 to accommodate the metal pressed downwardly as a result of this countersinking operation. The interfitting of the loop body with the retainer therefor does not require any accurate stamping operations and the resultant fastening thereof onto structural member 1 results in a finished appearance for the loop assembly, as shown in FIG. 8, which is desirable in some manufacturing procedures.

In FIG. 8 is shown the component parts of the fastener assembly with the loop unit formed in two parts which cooperates in a manner similar to that described in respect to the embodiment shown in FIGS. 5 and 6. In this constructional form the sheet metal wedge 40 is provided with an offset lug 42 at its end in order to facilitate the withdrawal of the wedge from its engaged position, as shown in FIG. 7, wherein the transverse forces acting between the distal edges of the loops 25a and 25b and the portions 12, 12' and 12a of the tubular structural member results in a tight interconnection of the parts.

Fastener assemblies of the type under consideration lend themselves to interconnecting structural units along balanced lines or of large areas, which is made possible by duplicating the fastener assemblies at different displaced points on the structural members. In the embodiment shown in FIGS. 10 to 12 is illustrated a mode of attaching a metallic plate to which may be affixed table legs of wrought iron or other metal to a table top of wood, metal, plastic, stone or the like. As shown in FIG. 10, the structural member 1 may have affixed thereto a plurality of sheet metal loop units of the type previously described in FIG. 9. These loop members 26, which may be retained in place by means of retainers 30, screwed or riveted into the body 1 or fastened thereto by adhesives, welding or soldering, are laterally displaced from each other a predetermined distance. The metallic plate 45 is provided with openings 48 which are displaced corresponding to the loops fixed by the retainers. Protuberances 46, extending transversely to the openings 48, correspond to the depth of retainers 30 so that when the plate 45 is interengaged with the loops 26 through the openings 48, the protuberances 46 serve to maintain the parts stable without rocking. Thereupon wedges 10 are driven rectilinearly through the aligned sets of the loops 26 to interconnect the structural member 45 with member 1 in a tight and secure fashion, which may be tightened from time to time as wear occurs by merely driving in further the wedges 10 by tapping against the large ends 15. The dismantling of the assembly may be effected by withdrawing the wedges 10 by engaging a tool in notches 19 to force the wedges in a reverse direction.

In FIG. 12 is shown an obverse view of the parts from that shown in FIG. 11, more clearly indicating the stabilizing function performed by the protuberances 46 for the entire plate 45 and the metal legs 50 which are soldered or welded to the plate 45 at the junctions 51.

As a further illustration of the universal adaptability of the wedge fasteners in accordance with the present invention to many different items of furniture or other structural bodies, FIGS. 13 to 15 illustrate the interconnection between a headpost 60 of a bed and a bed rail 61. In this constructional form the loop assembly may be of the type described above in conjunction with FIGS. 7 to 12 and, as shown in FIGS. 13 to 15, the retainer 30 in conjunction with fastening screws 35, serves to dispose the multiple loops 26 in a vertical direction with the enlarged distal edge 25a above the restricted edge 25b. The second structural member may assume the form of a metal plate 62 which is affixed to the inner face of the bed rail by means of fastening screws 65 and which is provided with an offset flange 64 seated within a vertical slot of the bed rail. The mounting flange 63 is offset transversely from plate 62 and is provided with vertically aligned openings 68 which interengage with the loops 26 to dispose the flange 63 at the proximal parts of the loops. Thereupon, the wedge 70, of flat sheet metal, having a thickness corresponding to the relatively small spacing between the walls of the loop, is driven downwardly to force a tight engagement in a transverse direction between the distal parts 25a and 25b of the loops and the parts of the flange 63 beyond and between the openings 68 in alignment therewith.

While the embodiments described above show the second structural member disposed in parallel to the first member, this disposition may be inclined, whereupon the relative inclination between the members for accommodating the opposed corresponding inclined edges of the sheet metal wedge is attained by arranging the distal edges of the loops along a straight line parallel to the mounting of the loops at their proximal parts. Alternatively, both the distal edges of the loops and the abutting portions of the second member may be inclined to combinatively make up the relative inclination corresponding to that between the opposite edges of the sheet metal wedge.

This application is a continuation-in-part of my following applications: Serial No. 273,723, filed February 27, 1952, now abandoned, for Key Lock Furniture Connector, Serial No. 371,505, filed July 31, 1953, now abandoned, for Tubular Furniture Mounting, and Serial No. 423,701, filed April 16, 1954, now abandoned, for Tubular Furniture Leg Fastener.

While I have described my invention as embodied in specific forms and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A fastener assembly for interconnecting a pair of interengaging structural members, comprising a pair of aligned elongated sheet metal loops of U-shape in transverse cross-section, fastening flanges extending in a plane transverse to said loops and on opposite sides thereof for affixing said loops to one of said members at their proximal parts and defining together with their distal parts and the opposite side walls of said loops a pair of substantially rectangular passages with a space therebetween, the spacing between the side walls of each loop being a fractional part of the length of said loops, said second member embracing said loops through aligned openings therein to dispose portions of said second member between and beyond said aligned openings adjacent to said passages at the proximal parts of said loops, the distal edges of said loops being inclined along a single continuous line relative to the portions of said second member at said proximal parts, and a flat sheet metal wedge having the opposite edges thereof straight and conforming to said relative inclination and of a thickness to enable rectilinear movement in said rectangular passages whereby a reciprocating movement of said wedge in a direction towards the restricted ends of said passages is translated into a movement between the members in a transverse direction and a permanently forceful connection therebetween at the portions between and beyond said aligned openings by tight contact of one edge of said sheet metal wedge with substantially the entire length of said portions and by tight contact of the opposite edge of said wedge with the distal edges of said loops.

2. A fastener assembly for interconnecting a pair of interengaging structural members, comprising a pair of upstanding aligned, spaced elongated sheet metal loops of U-shape in transverse cross-section stamped from an integral sheet of metal and provided with lateral flanges common to both loops, a retainer for said loops affixed to one of said members and provided with elongated apertures to permit said loops to pass therethrough while retaining said lateral flanges adjacent to said one member, the parts of said loops proximal to said retainer defining together with their distal parts and the opposite side walls of said loops a pair of substantially rectangular passages with a space therebetween, the spacing between the side walls of each loop being a fractional part of the length of said loops, said second member embracing said loops through aligned openings therein to dispose portions of said second member between and beyond said aligned openings adjacent to said passages at the proximal parts of said loops, the distal edges of said loops being inclined along a single continuous line relative to the portions of said second member at said proximal parts, and a flat sheet metal wedge having the opposite edges thereof straight and conforming to said relative inclination and of a thickness to enable rectilinear movement in said rectangular passages whereby a reciprocating movement of said wedge in a direction towards the restricted ends of said passages is translated into a movement between the members in a transverse direction and a permanently forceful connection therebetween at the portions between and beyond said aligned openings.

3. A fastener assembly as set forth in claim 2 wherein the retainer for said loops is flanged to provide a repository therein for the lateral flanges of the sheet metal loops, and countersunk openings adjacent the ends of said retainer for receiving the fasteners for affixing said retainer to said first mentioned member.

4. A fastener assembly as set forth in claim 3 wherein an additional countersunk opening is provided in said retainer at the middle thereof in the space between the U-shaped loops.

5. A fastener assembly as set forth in claim 2 wherein said second structural member is in the form of a metal plate provided with duplicate sets of aligned openings laterally displaced from each other, a second set of aligned spaced and elongated U-shaped sheet metal loops laterally displaced from the first set of loops corresponding to the lateral displacement between the sets of openings in said metal plate, and protuberances stamped in said metal plate of a depth corresponding to the depth of the retainers for the sheet metal loops and extending transversely thereto for imparting a balanced stability to the interengagement of said second member with said first member.

6. A fastener assembly as set forth in claim 1 wherein said second member is of tubular cross-section having the aligned openings therein along a line parallel to its longitudinal axis providing contact surfaces beyond and between said aligned openings, and said sheet metal wedge being disposed interiorly of said second member and having one of its edges abutting against said contact surfaces and the opposite edge thereof against the distal parts of said loops.

7. A fastener assembly as set forth in claim 1 wherein said second member is of planar form with the aligned openings therein permitting abutting contact therebetween and said first member and providing contact surfaces beyond and between said aligned openings, said sheet metal wedge being disposed perpendicularly to said second planar member and having one of its edges abutting against said contact surfaces and the opposite edge thereof against the distal parts of said loops.

8. A fastener assembly as set forth in claim 1 wherein said sheet metal loops are stamped from an integral sheet of metal and are provided with integral lateral flanges for affixation to said first-mentioned one member.

References Cited in the file of this patent
UNITED STATES PATENTS

| | | |
|---|---|---|
| 1,014,630 | Morrill | Jan. 9, 1912 |
| 1,076,838 | Okun | Oct. 28, 1913 |
| 1,095,636 | Hummer | May 5, 1914 |
| 1,506,442 | O'Hara | Aug. 26, 1924 |
| 1,625,612 | Jensen | Apr. 19, 1927 |
| 1,742,141 | Hicks | Dec. 31, 1929 |
| 2,461,648 | Macleod | Feb. 15, 1949 |
| 2,620,248 | Mutchnik | Dec. 2, 1952 |